(12) United States Patent
Johnson

(10) Patent No.: US 6,257,261 B1
(45) Date of Patent: Jul. 10, 2001

(54) CANOPY TOP WITH EQUIPMENT RACK

(76) Inventor: Mitchel B. Johnson, 441 Olive Ave., Palo Alto, CA (US) 94306

( * ) Notice: Subject to any disclaimer, the term of this patent is extended or adjusted under 35 U.S.C. 154(b) by 0 days.

(21) Appl. No.: 09/542,891

(22) Filed: Apr. 4, 2000

(51) Int. Cl.[7] ............... B60R 9/12; B63B 17/02; E04H 15/02; E04H 15/06

(52) U.S. Cl. ............... 135/96; 135/88.01; 114/343; 114/361; 224/309; 224/917; 224/917.5; 224/324; 224/325; 224/406

(58) Field of Search .................... 114/361, 343; 296/107.09; 224/406, 309, 322, 324, 325, 917, 917.5; 135/96, 88.01

(56) References Cited

U.S. PATENT DOCUMENTS 3,601,294 * 8/1971 Gjesdahl .
3,719,297 * 3/1973 Nowicki .
4,469,260 * 9/1984 Delahanty ............... 224/315
4,516,709 * 5/1985 Bott ............... 224/315
4,717,055 * 1/1988 San Juan ............... 224/331 X
4,728,019 * 3/1988 Olliges ............... 224/329
5,067,644 * 11/1991 Coleman ............... 224/324
5,303,667 * 4/1994 Zirkelbach et al. ............... 114/361
5,456,397 * 10/1995 Pedrini ............... 224/324
5,520,139 * 5/1996 King et al. ............... 114/361
5,769,291 * 6/1998 Chasan ............... 224/324
5,803,104 * 9/1998 Pollen ............... 135/96
5,931,114 * 8/1999 Bartholomew ............... 114/361

* cited by examiner

*Primary Examiner*—Robert Canfield
(74) *Attorney, Agent, or Firm*—Flehr Hohbach Test Albritton & Herbert LLP

(57) ABSTRACT

A canopy top for use with a vehicle having an open passenger compartment and carrying equipment. The canopy top has a frame adaptable for being secured to the vehicle and supported above the passenger compartment. A canopy overlies the frame. Means formed integral with the frame for securing equipment to the top is provided.

21 Claims, 3 Drawing Sheets

CANOPY TOP WITH EQUIPMENT RACK

FIELD OF THE INVENTION

This invention pertains to canopy tops for vehicles and more particularly to bimini tops for boats.

DESCRIPTION OF THE PRIOR ART

Boat canopy and bimini tops have heretofore been provided. Sports equipment racks capable of being accessorily attached to such boat tops have also been disclosed. There is, however, a need for a sun, or bimini, top having an equipment rack integral thereto which is easier to use.

OBJECTS OF THE INVENTION

In general, it is an object of the present invention to provide a canopy top for open-top vehicles having an integral equipment rack.

Another object of the invention is to provide a canopy top of the above character which is a bimini top for use with a boat.

Another object of the invention is to provide a canopy top of the above character which has a frame that is included in the equipment rack.

Another object of the invention is to provide a canopy top of the above character which protects equipment secured thereupon.

Another object of the invention is to provide a canopy top of the above character which is convertible.

Another object of the invention is to provide a canopy top which is durable and easy to use.

Additional objects and features of the invention will appear from the following description from which the preferred embodiments are set forth in detail in conjunction with the accompanying drawings.

DETAILED DESCRIPTION OF THE INVENTION

In general, a canopy top for use with a vehicle having an open passenger compartment is provided. The canopy top has a frame adaptable of being secured to the vehicle and supported above the passenger compartment. A canopy overlies the frame. Means formed integral to the frame for securing equipment to the top is provided.

Figure 1:
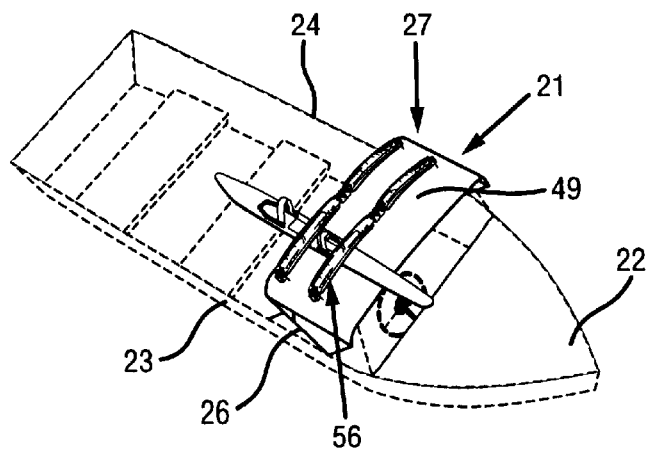
FIG. 1 is a perspective view of a canopy top and rack of the present invention mounted on a boat.

More specifically, the bimini top, sun canopy or canopy equipment rack 21 of the present invention is for use with an open top vehicle. An open top boat 22 having starboard and port gunwales 23 and 24 shown in dashed lines having the canopy or bimini top 21 of the present invention secured thereto is shown in FIG. 1. Top 21 includes a frame 26 formed from a plurality of stays. Frame 26 includes a roof portion 27 formed from at least a primary or leading support member or stay 28 in addition to first or fore and second or rear support members or stays 29 and 31.

Figure 2:
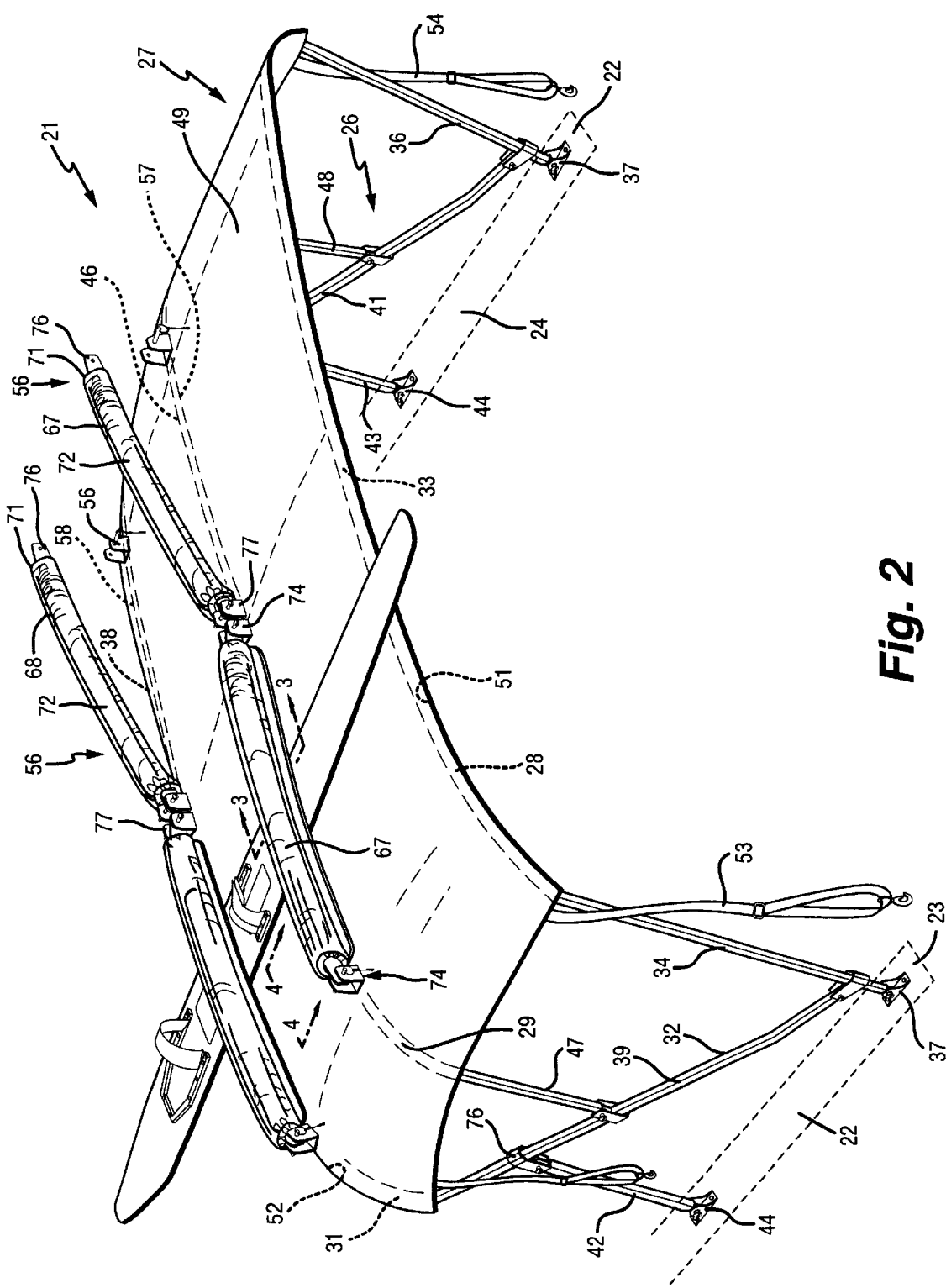
FIG. 2 is an enlarged perspective view of the canopy top and rack of FIG. 1.
Figure 4:
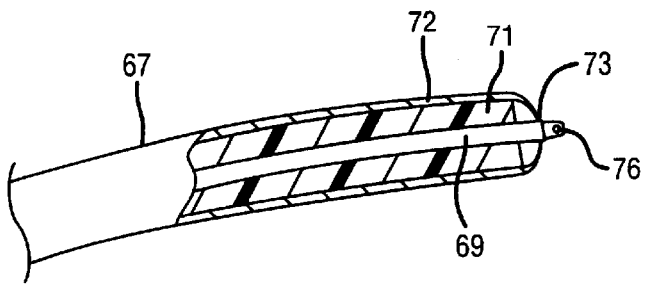
FIG. 4 is a side elevational view partially in section of the canopy top and rack of FIG. 1 taken along the line 4—4 of FIG. 2.

Leading U-shaped bowed member or stay 28 is formed of any suitable material, preferably a light-weight, corrosion resistant material such as aluminum tubing or other suitable alloy tubing. Tubing 32 is of a suitable diameter, as for example ranging from 0.75 to 2.0 inches and preferably 0.875 inches. Leading stay 28 includes cross bar portion 33 and right and left legs 34 and 36. Cross bar portion 33 is slightly arcuate in shape and is of a length so that it can extend over or span the width of the open passenger compartment disposed between first and second side walls 23 and 24 of boat 22 to which it is secured, as seen in FIG. 2. Symmetrical legs 34 and 36 of primary U-shaped stay 28 are of an equal length so that they suspend or support roof portion 27 of top 21 a comfortable distance above passengers who may be standing or sitting in the passenger compartment during use of the vehicle. Thus, legs 34 and 36 have a length ranging from 100 to 250 inches and preferably approximately 180 inches. Means 37 adapted for securing leading stay 28 to the first and second side walls or gunwales 23 and 24 of boat 22 are provided. The ends of legs 34 and 36 of primary support member 28 are each pivotally coupled to identical, conventional deck hinges or deck hardware 37 in a typical manner as is known in the art. Deck hinges 37 are symmetrically mounted in a conventional manner on opposite gunwales or sides 23 and 24 of boat 22 so that the longitudinal axes of the channels formed between the walls of hinges 37 are approximately parallel to the longitudinal axes of gunwales 23 and 24.

Rear U-shaped support stay 31 is, preferably, constructed of the same material as leading stay 28 and includes cross bar portion 38 and right and left symmetrical legs 39 and 41. Cross bar 38 is of the same length and shape as cross bar 33. Legs 39 and 41 of stay 31 are respectively pivotally coupled to legs 34 and 36 of primary stay 28 by conventional means known in the art. Each leg 39 and 41 of stay 31 has a length approximately 75 to 250 inches and preferably approximately 160 inches so that when top 21 is fully expanded, second stay 31 helps support roof portion 27 of top 21 at the same height as primary stay 28 and in spaced-apart, approximately parallel position aft of primary stay 28 by a distance ranging from 15 to 60 inches and, preferably, approximately 36 inches, as shown in FIG. 2.

Stay 31 is assisted in supporting roof portion 27 by symmetrical braces 42 and 43 each of which is constructed of the same material as stays 28 and 31. Each of braces 42 and 43 is pivotally coupled at one end to second stay 31 approximately 20 inches from the respective ends of legs 39 and 41 using conventional means as hereinbefore described and as seen in FIG. 2. The opposite ends of braces 42 and 43 are detachably and pivotally coupled to identical deck hinges 44 in a conventional manner similar to that used for securing legs 34 and 36 of primary stay 28 to deck hinges 37. Deck hinges 44 are similarly, symmetrically mounted in a conventional manner on starboard and port gunwales 23 and 24 of boat 22, aft of deck hinges 37 by a distance of approximately 50 to 150 inches and, preferably, approximately 85 inches.

Fore C-shaped support stay 29 is constructed of the same material as stays 28 and 31 and includes cross bar portion 46 and right and left symmetrical legs 47 and 48. Cross bar 46 has the same length and shape as cross bar 33. Each of legs 47 and 48 of stay 29 has a length approximately 50 to 200 inches and, preferably, approximately 120 inches, so that, when conventionally, pivotally coupled to rear stay 31 as hereinbefore described and when top 21 is fully expanded, first C-shaped stay 29 helps suspend roof portion 27 of top 21 at approximately the same height as primary stay 28 and in spaced-apart, approximately parallel position aft of primary stay 28 by a distance ranging from 15 to 60 inches and, preferably, approximately 36 inches, as seen in FIG. 2. Thus, legs 47 and 58 are coupled to rear stay 31 approximately 20 inches from the ends of legs 39 and 41 respectively.

A canopy 49 of webbed material, preferably lightweight tarpaulin or a similar substantially water-resistant natural or synthetic material, is suspended upon and overlies roof portion 27 as seen in FIG. 2. One large piece of material may be used to form canopy 49 or it may be comprised of several smaller pieces which are sewn or otherwise appropriately joined together in a conventional manner. Canopy 49 is secured to stays 28 and 31 of roof portion 27 by respective fore and aft flaps or loops 51 and 52. Loops 51 and 52 are created by folding or looping edges of canopy material 49 underneath and sewing or otherwise appropriately fixing the edges to the underside of canopy 49. Loops 51 and 52 are shaped and sized so that when top 21 is fully deployed, canopy 49 is tautly expanded, with respective stays 28 and 31 tautly but slidably disposed therein. Fore and aft reinforcing adjustable straps or tethers 53 and 54, as seen in FIG. 2, are optionally tied to the boat to further support and stabilize top 21 in the fully expanded position.

Figure 3:
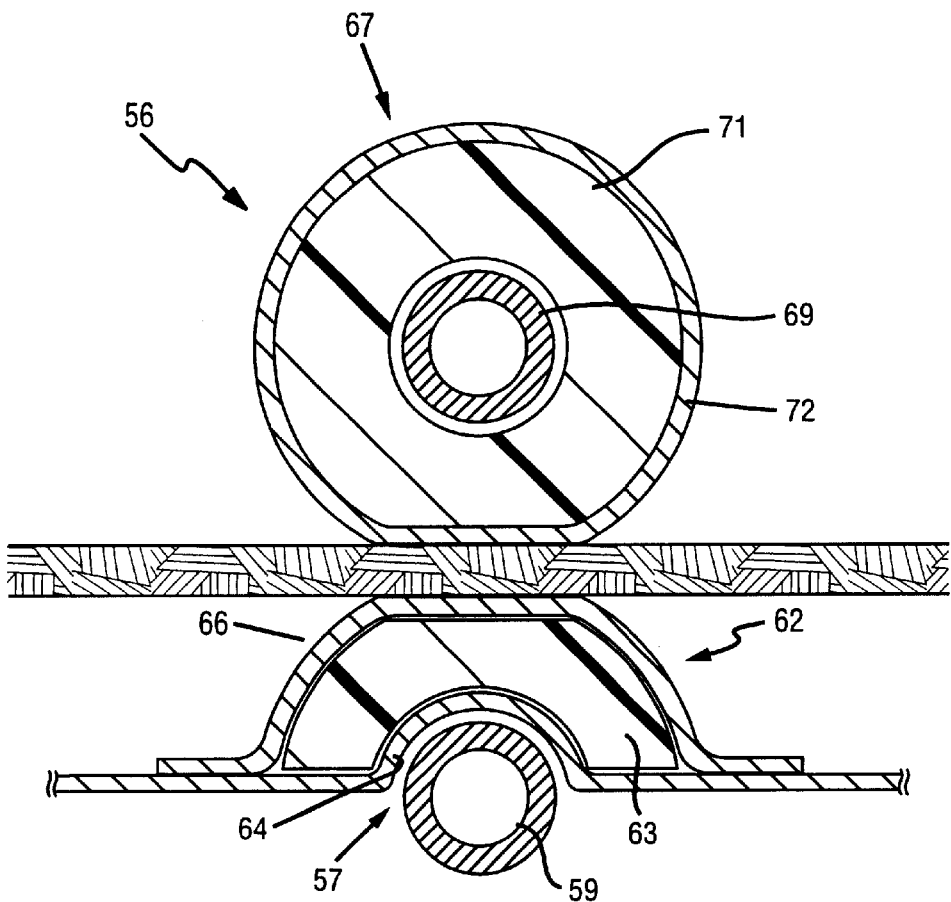
FIG. 3 is a cross-sectional view taken along the line 3–3 of FIG. 2.

Equipment securing means 56 for securing sports equipment such as water skis to roof portion 27 of top 21 includes at least first and second, or fore and aft, elongate lower clamping members 57 and 58 formed integral with frame 26. Elongate lower clamping members 57 and 58 are slightly arcuate in shape and include respective core tubular portions 59 and 61 of cross bars 38 and 46 of respective first and second stays 29 and 31, as seen in FIG. 3. Each lower clamping member 57 and 58 has a length of approximately 10 to 45 inches, preferably, approximately 25 inches, and includes means for protecting 62 or cushioning skis or equipment secured thereupon. Equipment protecting means 62 includes an elongate cushion 63 constructed from foam rubber, neoprene or any other suitable deformable and, preferably, elastic material. Each cushion 63 is of a length approximately equal to that of lower clamping members 57 and 58 and is provided with a longitudinally oriented arcuate recess 64 having a cross-sectional chord slightly larger than the outer diameter of tubular portions 59 and 61, as seen in FIG. 3. Thus, cushion 63 may be formed by longitudinally dividing foam rubber tubing having an inner diameter slightly larger than the outer diameter of tubing 32 or by other conventional means.

Two or more elongate sleeves or guide pockets 65, formed of similar tarpaulin material, are affixed to the bottom side of canopy 49 by being sewn or otherwise appropriately bonded thereto. Sleeve 65 has a diameter larger than the diameter of core tubular portions 59 and 61 of cross bars 38 and 46 which are loosely disposed or contained within sleeve 65 as shown in FIG. 3. Sleeve 65 has a length which may approximate the width of canopy 49 or, alternatively, sleeve 65 may comprise two or more horizontally aligned shorter sleeve segments which serve to loosely couple canopy 49 to core tubular portions 59 and 61.

Additional elongate sleeves or pockets 66, formed of similar tarpaulin material, are affixed to the topside of canopy 49 also by being sewn or otherwise appropriately bonded thereto. Sleeve 66 has dimensions similar to cushion 63 so that cushion 63 may be snugly but removably retained, enclosed or encased therein, with arcuate recess 64 downwardly oriented, facing canopy 49. When top 21 is fully expanded, sleeves 66, affixed to canopy 49 at appropriate positions and with cushions 63 disposed therein, overlie fore and rear stays 29 and 31, as seen in FIG. 3. With this configuration, through intervening canopy 49, central tubular portions or members 59 and 61 matedly support cushions 63 and sleeves 66.

Figure 5:
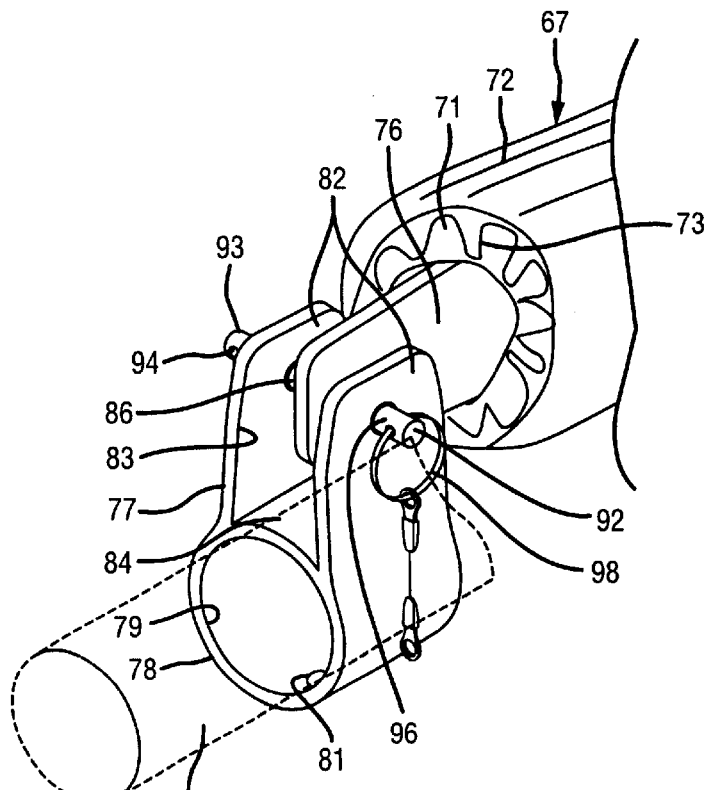
FIG. 5 is an enlarged perspective view of an equipment upper clamping member of the canopy and rack of FIG. 1.

Equipment securing means 56 further comprises at least first and second, or fore and aft, elongate upper clamping members 67 and 68 respectively coupled to first and second lower clamping members 57 and 58 for securing equipment between lower and upper clamping members 57, 58 and 67, 68. Upper clamping members 67 and 68 include central or core tubular members 69 of tubing 32 which is identical to, and has the same, or corresponding, arcuate shape and length as, core tubular portions 59 and 61. Tubular member 69 is frictionally retained within a tubular cushion 71 made of material similar to that of cushion 63. In order to accomplish this, cushion 71 is approximately equal in length, and has an unstretched inner diameter which is slightly smaller than the outer diameter of, tubular member 69. Tubular member 69 and overlying cushion 71 are frictionally retained within a sleeve or slip cover 72 formed of the same material as canopy 49. Sleeve 72 extends the length of cushion 71 and has a diameter slightly less than the outer diameter of cushion 71. Each end of sleeve 72 is provided with a drawstring 73 which is threaded through a circumferential loop of sleeve material (not shown) formed in a manner hereinbefore described. When pulled taut and tied, draw string 73 pulls and conforms the end of sleeve 72 tightly down and around the end of cushion 71. Means 74 are provided for partially detachably coupling said first and second upper clamping members 67 and 68 to said respective first and second lower clamping members 57 and 58. Preferably, first and second upper clamping members 67 and 68 are respectively coupled to first and second lower clamping members 57 and 58 by a combination of conventional eye ends 76 and jaw slides 77. Thus, both ends of tubular portions 59 and 61 of first and second lower clamping members 57 and 58 are provided with jaw slides 77, also known as pivot anchors, pivot couplers or pivot brackets, in a typical manner known in the art. Jaw slide 77 is formed of any suitable material such as plastic or a lightweight, corrosive resistant alloy and comprises a main body 78 having a circular in cross section bore 79 extending therethrough, as seen in FIG. 5. Bore 79 has a diameter slightly larger than the outer diameter of tubular portions 59 and 61 so that tubular portions 59 and 61 can be concentrically disposed therein. A small threaded hole 81 extending perpendicular to the longitudinal axis of bore 79, through body 78 into bore 79, is provided at an appropriate location so that a screw (not shown) may be inserted therethrough and up against tubular portions 59 and 61 disposed in bore 79. In this manner, jaw slide 77 is immobilized at an appropriate position and prevented from sliding and dislocating on tubular portion 59 or 61.

Formed integral to the body of jaw slide 77 are two vertically extending parallel wall members 82 which form a channel 83 having a longitudinal axis parallel to the longitudinal axis of bore 79 of jaw slide 77. Channel 83 is sized and shaped so that eye end 76 can be pivotally disposed therein as hereinafter described. A floor, or web 84, of channel 83 is provided by the portion of body 78 intersecting the two wall members 82. Each wall member 82 has corresponding, horizontally aligned holes 86 through which a pin or a screw extends thereby pivotally coupling eye end 76 to jaw slide 77 as hereinafter described and as seen in FIG. 5.

Figure 6:
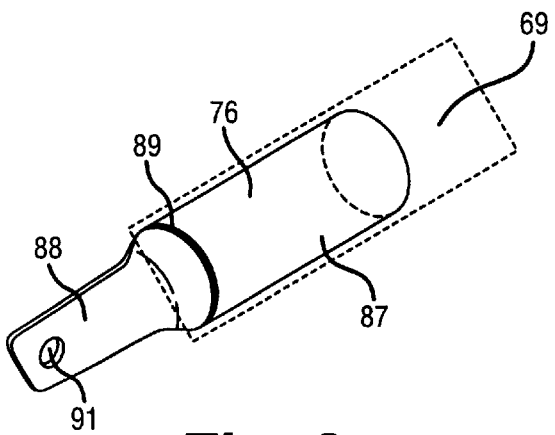
FIG. 6 is an enlarged perspective view of a portion of an equipment clamping member of FIG. 5.

Both ends of tubular members 69 of upper clamping members 67 and 68 are provided with conventional eye ends 76 made of any suitable, corrosion resistant material such as plastic or light alloy. Eye end 76 comprises a cylindrical body or core portion 87 and a tongue portion 88 as seen in FIG. 5 and FIG. 6. Body portion 87 has a diameter only slightly less than the internal diameter of tubular member 69 so that it can be frictionally, fit and retained within the ends thereof. The portion of body 87 of eye end 76 retained in tubular member 69 is approximately inch in length. At the junction of body 87 and tongue 88 portions, eye end 76 is provided with a circumferential collar 89 which prevents body 87 from being pushed further into tubular member 69. Body 87 is also retained within tubular member 69 by crimping tubing 32 after body 87 has been disposed therein or by securing body 87 utilizing any other appropriate manner.

Formed integral to and extending from body 87 of eye end 76 is tongue portion 88 which is sized and shaped in order to be disposed within channel 83 of jaw slide 77. Thus, the length of tongue 88 approximates the length of the wall members 82 of jaw slide 77, ranging from 0.5 to 1.5 inches. Tongue 88 of eye end 76 has a hole 91 which, when tongue 88 is disposed within the channel 83 of jaw slide 77, is horizontally aligned with holes 86 in each wall member 82 of jaw slide 77. A screw or removable pin 92, passed horizontally through the aligned holes 86 and 91, pivotally couples tongue 88 of eye end 76 to jaw slide 77 as seen in FIG. 5. A particularly suitable pin for this coupling is a conventional quick release pin 92. Typically formed of stainless steel or another corrosion resistant light alloy, distal extremity 93 of pin 92 is provided with a detent button 94 which, when moderately forcefully pushed through all of the aligned holes 86 and 91, permits retention of pin 92 in eye end 76 and jaw slide 77 notwithstanding considerable vibration or movement thereof. Nevertheless, pin 92 may be removed by being moderately forcefully pulled. In addition, proximal extremity 96 of pin 92 has a small transverse bore 97 extending therethrough and through which a stainless steel wire lanyard 98, or other suitable, durable filament, is threaded. Lanyard 98 is also secured to either jaw slide 77 or eye end 76 which makes quick release pin 92 readily available for coupling and also prevents it from being misplaced after uncoupling.

Canopy 49 is provided with slits, slots or holes (not shown) overlying each jaw slide 77 in order to accommodate each corresponding set of vertically extending parallel wall members 82 and to permit wall members 82 to extend from below to above canopy 49 for coupling to eye ends 76. The type of pin or screw used to couple tongue portion 88 of eye end 76 to channel 83 in jaw slide 77 determines whether the end of an upper clamping member 67 or 68 is detachably or removably, respectively coupled to the end of a lower clamping member 57 or 58 for operation as hereinafter described. Preferably, the ends of clamping members facing gunwales 23 and 24 of boat 22 are detachably or removably coupled by using removable pins 92 whereas the ends of clamping members facing the middle of canopy 49 are pivotally coupled to one another by using either permanent screws, quick release pins or other appropriate hardware.

Operation and use of canopy top equipment rack 21 of the present invention can now be briefly described in conjunction with the figures as follows. Let it be assumed that bimini top 21 is to be installed on open top boat 22 for the first time.

In preparation for installation, and after appropriate measurements are made, deck hinges 37 and 44 are affixed to gunwales 23 and 24 of boat 22 as hereinbefore described. An operator can couple top 21 to boat 22 in either the folded or expanded configuration. Preferably, the ends of legs 34 and 36 of primary support member 28 are respectively coupled to deck hinges 37 first and with top 21 in the folded configuration. The operator then gently expands top 21 by, preferably, grasping the middle portion of rear stay 31 and pulling it in a rearward direction. Braces 42 and 43 are aligned with and coupled to deck hinges 44. Tethers 53 and 54 may then be secured to boat 22 to stabilize top 21.

Let it be further assumed that the operator wishes to secure water skis to top 21. The outer end portions of upper clamping members 67 and 68 facing gunwales 23 and 24 are respectively uncoupled from lower clamping members 57 and 58 by removing quick release pins 92 and lifting the ends of upper clamping members 67 and 68 whereby they pivot upward and inwardly, around the opposite ends of respective lower clamping members 57 and 58 and into an open position or configuration. The water skis are placed on lower clamping members 57 and 58, preferably with ski bindings disposed between sets of clamping members and facing upwards. Upper clamping members 67 and 68 are subsequently moved into the closed position over the skis in a reverse manner and the outer ends are respectively re-coupled to the outer ends of lower clamping members 57 and 58 by replacing the quick release pins 92. While slightly deforming cushions 63 and 71, the skis are securely retained therebetween. The aforementioned procedure is reversed in order to remove equipment from top 21.

Top 21 becomes convertible or collapsible by uncoupling or detaching braces 42 and 43 from deck hinges 44. Thus, when no equipment is being carried on top 21, frame 26 and canopy 49 together may be folded toward the bow of boat 22, thereby creating accordion folds or pleats (not shown) in top 21, and stored forward of the windshield. In addition, top 21 may be completely removed from boat 22 for cleaning or repair by also detaching leading stay 28 from deck hinges 37.

It should be appreciated that variations in the configuration and characteristics of the canopy top and rack unit are within the purview of the present invention. Thus, the size, number and orientation of the support members may vary. In addition, the number of sets of upper and lower clamping members may vary. Preferably, at least two sets of upper and lower clamping members are horizontally aligned in spaced apart parallel positions on the port side of the top with two additional corresponding sets symmetrically aligned on the starboard side of the top. Depending on the size of the top, additional sets of clamping members may be incorporated. Sets of clamping members may also be combined or integrated with other than canopy tops and still be within the purview of the present invention. For example, traditional sun tops can be provided with clamping members. In addition, larger boats are equipped with tarpaulin cabins having side walls in addition to tops. Equipment securing means can be included with such tarpaulin side walls.

Clamping members can also be differently configured and still be within the concept of the present invention. For example, upper clamping members 67 and 68 can be detachably coupled to lower clamping members 57 and 58 at both ends. Alternatively, upper members 67 and 68 can be non-pivotally and non-detachably coupled to lower members 57 and 58 at both ends so that equipment is simply slipped, and frictionally retained, in between upper and lower members.

From the foregoing, it should be appreciated that a canopy top with equipment rack integral thereto for use with an open-top vehicle has been described that presents numerous advantages. The top and rack unit is lightweight, stable, convertible and easy to install or remove. In addition, the equipment rack need never be removed as it is an integral part of the top, even when the top is temporarily folded or removed for repair or cleaning. A variety of equipment, including, but not limited to, skis, wakeboards, fishing poles, paddles and flagpoles, may be secured in the rack during operation of the vehicle.

What is claimed is:

1. A canopy top for use with a vehicle having an open passenger compartment and carrying equipment comprising a frame adaptable for being secured to the vehicle and supported above the passenger compartment, a canopy overlying the frame and means formed integral with the frame for securing equipment to said top.

2. A top as in claim 1 wherein said equipment securing means includes at least first and second lower clamping members formed integral with said frame.

3. A top as in claim 2 wherein said frame includes at least first and second stays, said first and second lower clamping members being formed integral with said first and second stays respectively.

4. A top as in claim 2 wherein said equipment securing means includes first and second upper clamping members respectively coupled to said first and second lower clamping members for securing equipment between said lower and upper clamping members.

5. A top as in claim 4 further including means for partially detachably coupling said first and second upper clamping members to said respective first and second lower clamping members.

6. A top as in claim 5 further including means for pivotally coupling said first and second upper clamping members to said respective first and second lower clamping members.

7. A top as in claim 4 further including at least one cushion member whereby equipment secured on said top is protected from damage.

8. A top as in claim 7 wherein said canopy is provided with sleeves, said sleeves at least partially encasing said upper clamping members.

9. A top as in claim 8 wherein said sleeves encase said cushion member.

10. A top as in claim 1 wherein the frame and canopy are convertible.

11. A canopy equipment rack for use with a vehicle having an open passenger compartment and carrying equipment comprising a frame adaptable of being secured to the vehicle, the frame having a top portion adaptable for being supported above the passenger compartment, a canopy overlying the top portion, first and second lower clamping members formed integral with said frame and first and second upper clamping members respectively coupled to said first and second lower clamping members whereby equipment can be secured between said lower and upper clamping members.

12. A rack as in claim 11 wherein each lower and upper clamping member includes a cushion whereby equipment secured therebetween is protected from damage.

13. A rack as in claim 12 wherein said canopy includes sleeves which at least partially encase said upper clamping members.

14. A bimini top for use with a boat having an open passenger compartment disposed between first and second side walls and with a water ski comprising first and second bowed members, means adapted for securing the first and second bowed members to the first and second side walls of the boat so that the first and second bowed members extend over the passenger compartment in spaced-apart positions, a canopy of a webbed material overlying the first and second bowed members, first and second elongate clamping members, first mounting means for mounting the first clamping member to the first bowed member and second mounting means for mounting the second clamping member to the second bowed member for movement between an open position for permitting the water ski to be removably placed on the second bowed member and a closed position for clamping the water ski between the second clamping member and the second bowed member.

15. A bimini top as in claim 14 wherein the second mounting means includes means for pivotably mounting the second clamping member to the second bowed member.

16. A bimini top as in claim 14 wherein the second mounting means includes means for removably mounting the second clamping member to the second bowed member.

17. A bimini top as in claim 16 wherein the second clamping member has first and second end portions, the second mounting means including a first pin for securing the first end portion of the second clamping member to the second bowed member and a second pin for securing the second end portion of the second clamping member to the second bowed member.

18. A bimini top as in claim 14 wherein the first and second clamping members extend parallel to each other when mounted to the first and second bowed members.

19. A bimini top as in claim 14 wherein the first mounting means includes means for pivotably mounting the first clamping member to the first bowed member.

20. A bimini top as in claim 14 wherein the first bowed member has an arcuate portion extending between the first and second side walls of the boat and wherein the first clamping member has an arcuate portion corresponding to the arcuate portion of the first bowed member.

21. A bimini top as in claim 14 further comprising an addition first clamping member and an additional second clamping member, additional first mounting means for mounting the additional first clamping member to the first bowed member and additional second mounting means for mounting the additional second clamping member to the second bowed member for movement between an open position for permitting an additional water ski to be removably placed on the second bowed member and a closed position for clamping the additional water ski between the additional second clamping member and the second bowed member.

* * * * *